3,062,186
VALVE AND CONTROL THEREFOR
Nat Cordis, Crown Farm, Silver Lake, Wis.
Filed Aug. 22, 1960, Ser. No. 51,205
9 Claims. (Cl. 119—81)

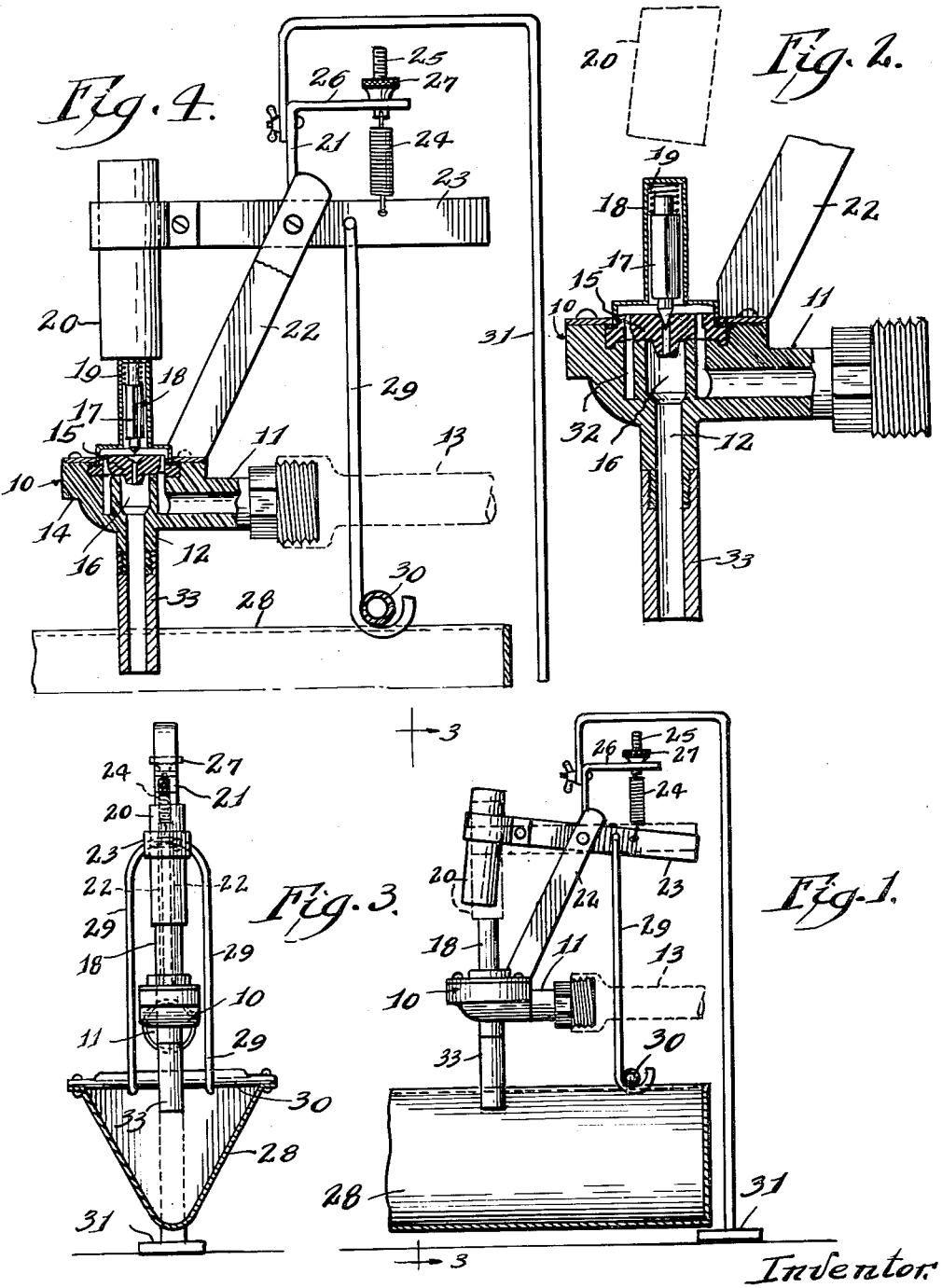

This invention relates to flow control devices, and, more particularly, to devices wherein a liquid level is constantly maintained by a level-responsive valve. More particularly, it relates to poultry watering devices embodying such valves to control a water supply conduit.

In poultry husbandry it is necessary to supply clear drinking water and to hold a constant water level in troughs regardless of water line pressure or size of flock and demand.

It is therefore an object of the invention to provide a level-responsive valve means which is quick acting and does not depend upon a float control. A further object of the invention is to provide a valve and control therefor which is adapted to hold a constant water level in troughs regardless of water supply pressure or the speed at which water is removed from the trough. These and other objects of the invention will become more apparent as my description thereof proceeds.

By this invention, a trough is suspended by the valve means which is a quick-acting, full-flow valve actuated by a magnet means which is positioned by the weight of the water in the trough. When the trough is lightened by consumption of water, the magnet is moved into valve-opening position. This permits water to enter the trough until the necessary weight is attained to withdraw the magnet, thereby permitting the normally-closed valve to close and again shut off the flow of water into the trough.

Further details and advantages of the invention will be described by reference to the accompanying drawing wherein:

FIGURE 1 is an elevation of one end of a trough assembly;

FIGURE 2 is an enlarged central section of the valve in FIGURE 1 in the normally closed position;

FIGURE 3 is an elevation taken along the line 3—3 in FIGURE 1; and

FIGURE 4 is an enlarged elevation, partly in section, corresponding to FIGURE 1 but with the valve in an opened position.

Referring to the drawing, the valve 10 is provided with an inlet 11 and an outlet 12, inlet 11 being connected to a water supply conduit 13. The valve 10 includes a housing 14, resilient annular flow-control means 15 provided with orifice or port 16 and magnetic needle plug 17 within the non-magnetic cylindrical cap 18 enclosing the plug 17 and fixed to housing 14. A coil spring 19 acts to urge plug 17 into orifice 16. However, magnet 20, when in proximity to the upper end of the plug 17 and cap 18, lifts the plug 17 against the action of the spring 19 to open the valve.

The valve 10 is secured to the frame 21 having spaced member 22 in which the beam 23 supporting the magnet 20 is pivotally held. A tension spring 24 is fixed at one end to the beam 23 and at the other end to adjustable spring anchor 25 extending through bar 26 secured to frame 21. A knurled knob 27 adjusts the spring 24 and hence the sensitivity to changes in weight of the trough 28 into which the outlet 12 discharges.

A trough hanger 29 depends from the beam 23 and supports the trough 28 via the cross bar 30 fixed to the trough 28. An upright stand 31 or an overhead chain or cable (not shown) supports the frame 21, and through it and hanger 29, the trough 28 is suspended for operation as described.

FIGURES 1 and 2 show the valve in its closed position whereas in FIGURE 4 the valve is open with flow from inlet 11 through annular channel 32 over the resilient annular flow control member 15 and through orifice 16 into the outlet 12 and from the discharge tube 33 into the trough 28.

The permanent magnet 20 may be of any desired design. However, I prefer a permanent bar magnet of the alnico type. A typical configuration of such a permanent magnet is at least four times as long as the diameter of the bar. If desired, the lower face of the magnet may be provided with a hill-and-valley corrugated surface to present a multiplicity of poles.

The magnetically attracted valve plug 17 may be entirely composed of magnetic metal. Nevertheless it is contemplated that the body of the plug may be corrosion-resistant plastic, brass, or the like with a para-magnetic head fixed to the upper end.

The valve housing and components other than needle plug 17 are non-magnetic. The valve body 14 is preferably of a durable plastic.

Although I have described my invention with respect to certain embodiments thereof, these are by way of illustration and my invention is not necessarily limited thereto.

What I claim is:

1. In combination with an elongated watering trough, a water-supply conduit, a discharge conduit delivering water into said trough, a quick-acting full-flow valve means between said conduits, and permanent magnetic control means positioned by the quantity of water in said trough and adapted to be magnetically coupled with said valve means whereby when the water in said trough decreases the valve will be actuated by said control means to cause a quick full flow of water into said trough.

2. The apparatus of claim 1 wherein said magnetic control means includes a pivoted beam, said magnet being carried by said beam, said permanent magnet having a first position remote from the valve means and a second position in magnetic coupling with the valve means, and means for suspending said trough from said beam.

3. The apparatus of claim 2 wherein said means for suspending said trough from said beam comprises depending hanger means.

4. In combination with a supply conduit, a discharge conduit, a quick-acting full-flow valve means between said conduits, and a permanent magnet having a first position remote from the valve means and a second position in magnetic coupling contact with the valve means, said permanent magnet actuating means adapted to be magnetically coupled with said valve means thereby to actuate the valve means and cause quick full flow through said discharge conduit.

5. The apparatus of claim 4 wherein said valve means includes a magnetic needle plug which is actuated by the magnetic force of said pivoted actuating means.

6. The apparatus of claim 4 which includes a reservoir into which said discharge conduit delivers, and means responsive to the quantity of liquid in said reservoir for controlling said actuating means.

7. A valve apparatus comprising a valve housing, said housing having an inlet and an outlet, a diaphragm within said housing interposed said inlet and said outlet, said diaphragm being adapted to normally close said outlet, fluid access conduit means communicating between said inlet and the top of said diaphragm, fluid pressure being exerted on said diaphragm through said access conduit means, port means in said diaphragm and discharging into said outlet, needle plug means normally closing said port means, said needle plug means being paramagnetic, a non-magnetic guide closure for said needle plug and forming a projecting wall portion of said housing, compression spring means extending between said plug and the upper wall of said guide enclosure and normally urging said needle plug to close said port means, shiftable permanent magnet means exterior of said housing, said permanent magnet means having a first position remote from said housing and a second position in magnetic coupling with said needle plug, and pivoted beam means supporting said shiftable permanent magnet, said permanent magnet means being positioned adjacent said needle plug in response to the depletion of fluid in a reservoir into which said outlet discharges whereby said plug is lifted to expose said port means in said diaphragm and returns to its normally closed position when uncoupled from the permanent magnet.

8. The valve apparatus of claim 7 which includes means to support said housing, linkage means between said reservoir and said beam means whereby decreased quantity of fluid in the reservoir shifts the permanent magnet to said second position in magnetic coupling with the enclosed needle plug and when in contact with the said guide enclosure overcomes the spring and raises the plug to open the port in the diaphragm.

9. In combination with a vertically displaceable poultry waterer including a reservoir to which poultry have access, a primary water supply conduit, a delivery conduit discharging into said reservoir, a quick-acting full-flow diaphragm valve means having a paramagnetic element piloting the flow between said conduits, support means for said reservoir, lever means responsive to the quantity of water present in said reservoir, and magnetic control means positioned by said lever means, said magnetic control means including a lever-supported permanent magnet having a first position axially remote from said valve means and a second position in magnetic coupling contact with said paramagnetic element when the quantity of water in said reservoir decreases to a pre-selected extent whereby the valve is actuated and there is a quick full-flow of water into said reservoir until a pre-selected quantity is again present.

References Cited in the file of this patent
UNITED STATES PATENTS

| | | |
|---|---|---|
| 2,541,622 | Toadvine | Feb. 13, 1951 |
| 2,629,401 | Miller | Feb. 24, 1953 |
| 2,879,743 | Hostetler | Mar. 31, 1959 |
| 2,914,086 | Beller | Nov. 24, 1959 |
| 2,965,117 | Gallacher | Dec. 20, 1960 |